United States Patent [19]
Taplin et al.

[11] 4,361,040
[45] Nov. 30, 1982

[54] INTEGRATING ANGULAR ACCELEROMETER

[75] Inventors: Lael B. Taplin, Union Lake; Bernard R. Teitelbaum, Beverly Hills, both of Mich.

[73] Assignee: The United States of America as represented by the Secretary of the Army, Washington, D.C.

[21] Appl. No.: 216,416

[22] Filed: Dec. 15, 1980

[51] Int. Cl.$^3$ .............................................. G01P 15/08
[52] U.S. Cl. ................................... 73/503; 73/516 R
[58] Field of Search ..................... 73/503, 515, 516 R, 73/516 LM, 517 A, 521

[56] References Cited
U.S. PATENT DOCUMENTS 2,907,560 10/1959 Stedman ........................... 73/516 R
3,059,480 10/1962 Carpenter ............................ 73/506
4,002,077 1/1977 Taplin ................................. 73/503

FOREIGN PATENT DOCUMENTS 713550 8/1954 United Kingdom .................. 73/515

Primary Examiner—James J. Gill
Attorney, Agent, or Firm—Nathan Edelberg; Robert P. Gibson; Max Yarmovsky

[57] ABSTRACT

The present invention is directed to an integrating angular accelerometer which has a neutrally buoyant mass, thereby eliminating the detrimental effect of high shock and vibration loads. The accelerometer includes a housing and an inertial mass positioned in the housing, arranged for relative rotation with respect to the housing. An annular channel is provided between the housing and the inertial mass, located about the acceleration sensitive axis and dimensioned to cause fluid flow upon relative rotation of the housing and inertial mass in the direction of relative rotation. The fluid contained within the channel is a viscous fluid having a density equal to that of the inertial mass so as to achieve a neutral buoyancy of the inertial mass. A splitter for blocking fluid flow in the channel is provided so as to produce a differential pressure which corresponds to the relative angular rotation of the inertial mass and housing. A transducer is provided for converting the differential pressure into an electrical signal corresponding thereto.

3 Claims, 4 Drawing Figures

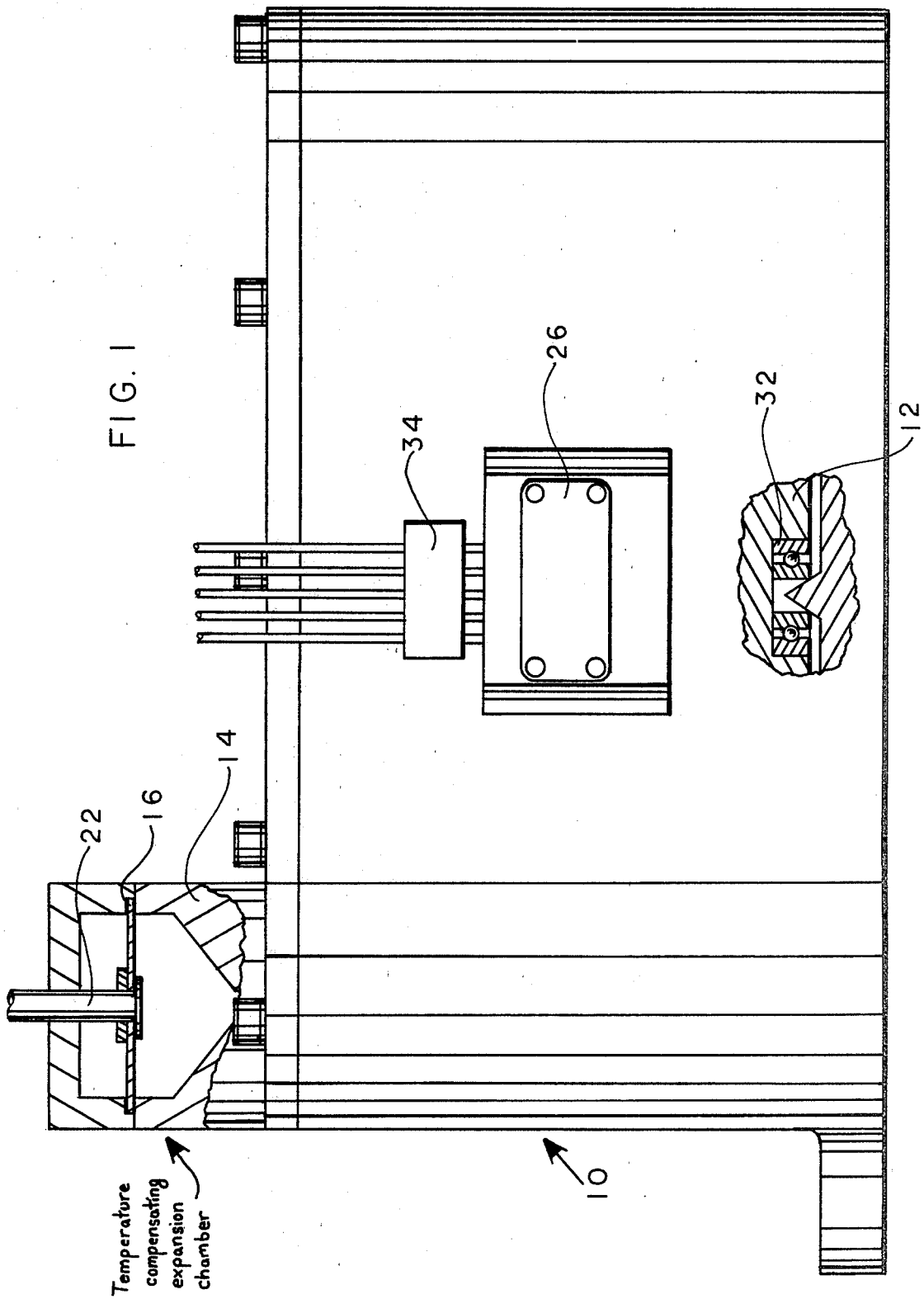

INTEGRATING ANGULAR ACCELEROMETER

The invention described herein was made in the course of a contract with the Government and may be manufactured, used and licensed by or for the Government for governmental purposes without the payment to us of any royalties thereon.

BACKGROUND OF THE INVENTION

1. Field of the Invention

The invention relates to intergrating angular accelerometers for measuring angular rate of a rotating body. An accelerometer constructed according to the invention can be used for sensing angular velocities that are varying relatively rapidly.

2. Brief Description of the Prior Art

Angular accelerometers as used heretofore, such as shown and described in U.S. Pat. No. 3,819,234, provide acceleration signals and, in order to obtain angular rate, the signals must be intergrated, usually by electronic means. Noise is a serious problem which must be overcome to provide useful angular rate signals; U.S. Pat. No. 4,002,077, which is incorporated by reference, presents a solution to this problem by using a large hydrostatic bearing to support the inertial mass. In the device of the latter patent, an annular channel of laminar dimensions is provided between the internal mass and the base groove. The housing, including the channel, is filled with viscous fluid and the inertial mass is supported in the fluid. When the housing rotates relative to the inertial mass, upon angular acceleration of the device in which the accelerometer is housed, a pressure differential proportional to the angular rate is provided across two pick-off ports connected to the annular channel. This is due to the viscous pumping effect caused by relative motion between the housing and inertial mass. Signals of a relatively large band width that are substantially noise free are provided. The device is relatively simple in construction in that it comprises only two parts, an inertial mass or wheel supported by a hydrostatic bearing and a housing filled with viscous fluid.

Standard floated spinning wheel rate sensors have been used but with what is usually a highly shortened life due to the extreme shock and vibration amplitudes found on tanks and other heavy armament systems. Fluidic sensors are another alternative but they generally have low output signals thus requiring signal amplification using fluidic amplifiers, etc.

SUMMARY OF THE INVENTION

The present invention is directed to an intergrating angular accelerometer which has a neutrally buoyant mass, thereby eliminating the detrimental effect of high shock and vibration loads.

The intergrating angular accelerometer includes a housing and an inertial mass positioned in the housing, arranged for relative rotation with respect to the housing. An annular channel is provided between the housing and the inertial mass, located about the acceleration sensitive axis and dimensioned to cause fluid flow upon relative rotation of the housing and inertial mass in the direction of relative rotation. The fluid contained within the channel is a viscous fluid having a density equal to that of the inertial mass so as to achieve a neutral buoyancy of the inertial mass. A means for blocking fluid flow in the channel is provided so as to produce a differential pressure across the means for blocking flud flow which corresponds to the relative angular rotation of the inertial mass and housing. A mechanism is provided for sensing the differential pressure and to provide a signal corresponding thereto.

BRIEF DESCRIPTION OF THE DRAWINGS

The objects and advantages of the invention will become apparent from the following description of the invention, particularly when read in conjunction with the drawings, wherein:

FIG. 1 is a detail, partly in cross-section, of an angular accelerometer in accordance with the present invention;

DESCRIPTION OF THE PREFERRED EMBODIMENTS

The neutrally buoyant mass integrating angular accelerometer of the present invention is capable of withstanding very large shock and vibration amplitudes, such as 1000 g., without sustaining damage to the sensor.

The functions and operation of the accelerometer are fully described in U.S. Pat. No. 4,002,077. However, as contrasted with a hydrostatic bearing system, the use of a neutrally buoyant mass virtually eliminates the detrimental effect of high shock and vibration loads.

Figure 2:
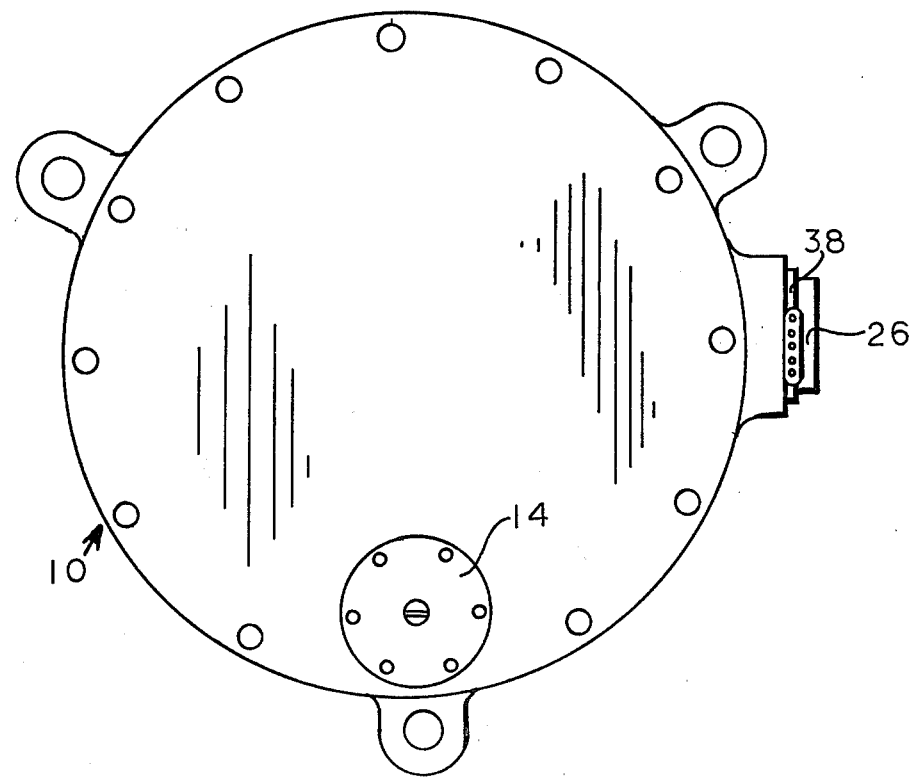
FIG. 2 is a top view of the accelerometer of FIG. 1.

Referring to FIGS. 1 and 2, the housing 10 is fixed to the vehicle whose angular acceleration is to be measured. A seismic mass 12, is supported within the housing on instrument bearings 32, one on each end of the seismic mass axes.

Figure 3:
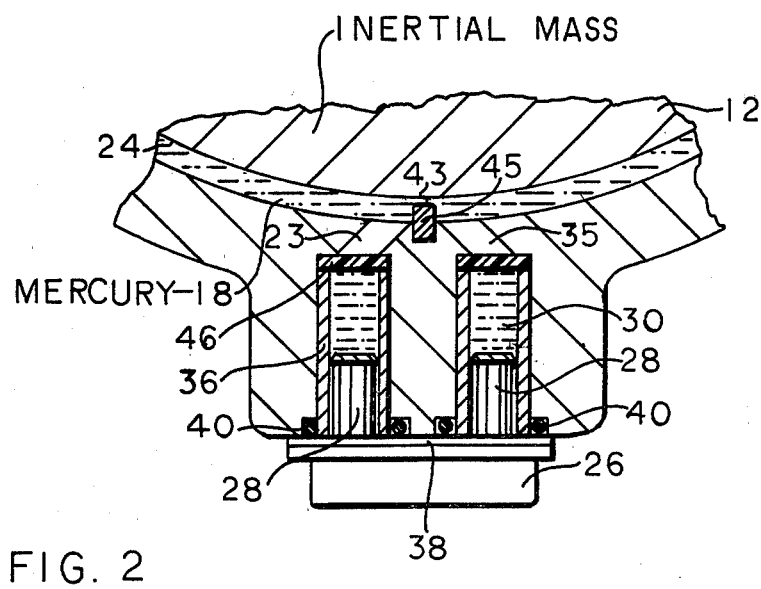
FIG. 3 is a fragmentary, cross-sectional view of the splitter and pressure transducer region of the accelerometer; and, FIG. 4 is an enlarged, fragmentary cross-sectional view of an outer portion of the accelerometer of FIG. 1, showing a portion of the inertial mass, the annular channel and the housing.

Referring now to FIGS. 1 through 3, the space between the seismic mass 12 and the housing 10, is completely filled with a viscous fluid 18, perferably mercury. The seismic or inertial mass 12 is compounded of a material having a mass density equal to that of the fluid 18. Where the fluid is mercury, the inertial mass 12 is preferably 50% tungsten and 50% molybdenum. Other combinations of viscous fluids and inertial mass include Bromoform and anodized aluminum and Flourinect (FC40) and beryllium. The matching of the fluid density to that of the inertial mass produces a neutral buoyancy of the inertial mass.

Temperature changes can produce volumetric expansion changes which are different for the housing 10, the mercury or other fluid 18 and the inertial mass 12. To compensate for this difference in expansion, a temperature compensating expansion chamber 14, is provided. The level of the mercury 18, contained within the temperature compensating reservoir 14, raises and lowers with varying temperatures causing movement of the flexible diaphragm 16, which permits the reservoir volume to always be equal to that of the mercury 18.

As illustrated in FIG. 3, a pressure difference is established across a vane or splitter 45. A small clearance 43 is provided between the splitter 45 and the inertial mass 12, so that there is no dry or coulomb frictional resistance on the inertial mass 12.

The mercury containing channel 24 includes sensing regions 23 and 35 where the pressure difference is established as a function of the turning rate and turning acceleration. Within the operating range of primary interest, the pressure difference is predominately a function of the turning rate only. The pressure difference is transmitted via the diaphragms 46, which can conveniently be of a material such as Mylar, through the fluid isolators 28 to the pressure transducer 26. The diaphragm 46 serves to isolate the mercury 18 from an isolation fluid 30, such as a silicone liquid, which is in contact with the fluid isolators 28 which transmit the pressure fluctuations to the pressure transducer 26.

The fluid isolators 28 are inserted into the cylinders 36, which are retained in the housing 10 by means of a press-fit. Sealing of the transducer 26 is achieved by means of a gasket 38 while "O"-rings 40 seal the press-fit cylinders 36.

The pressure signals are converted by the small solid state differential pressure transducer 26 to an electrical signal. A connector 34 serves to transmit the electrical signal to any desired end point, such as a read out device.

Figure 4:
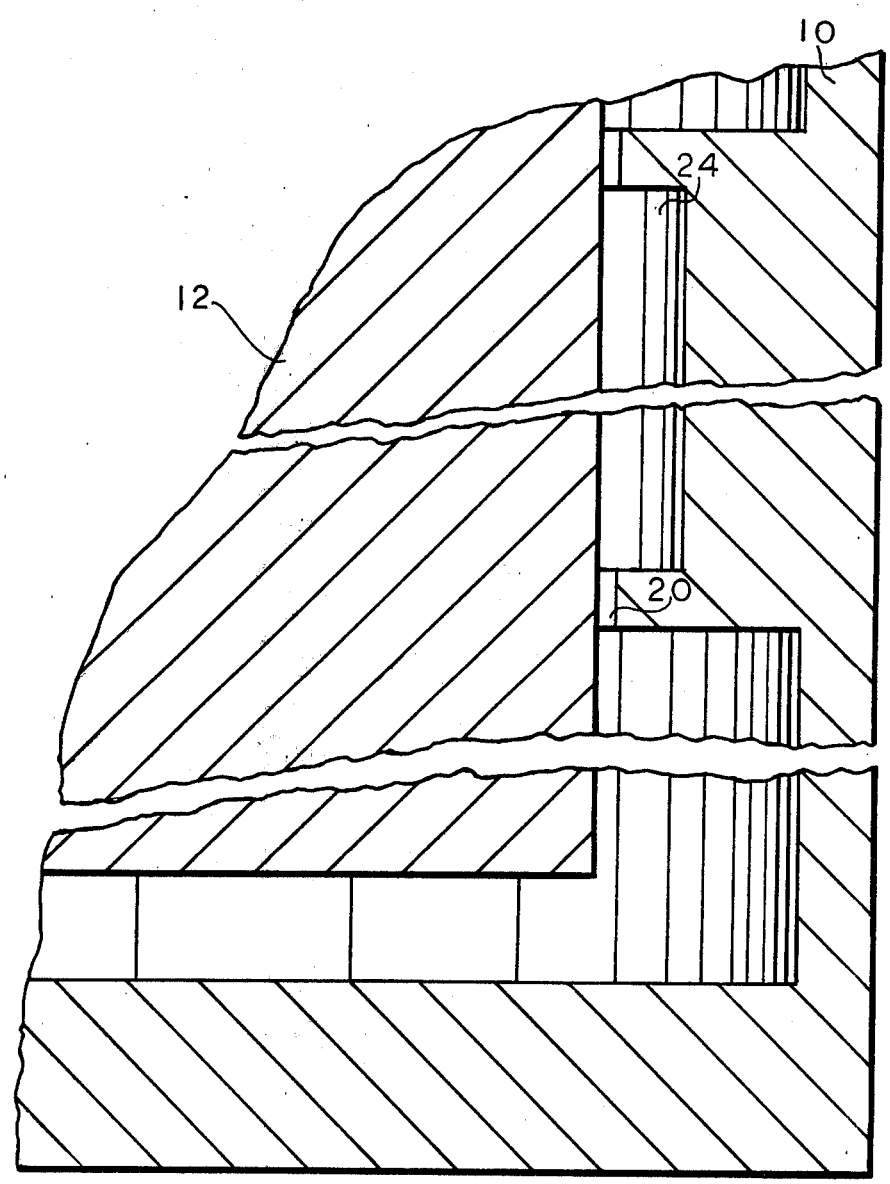

The inertial mass 12, is supported by low-friction rolling contact instrument bearings 32, which must be precision mounted due to the small clearances which are provided. As well known in the art, ball or roller bearings can be used. For example, the clearance space 20, shown in FIG. 4, between the housing 10 and the inertial mass 12 is preferably about 0.003 inches. The annular mercury filled channel 24 is about 0.003 inches in width and on the order of $\frac{3}{4}$ of an inch in height. The diameter of the annular channel is in the order of about $2\frac{1}{2}$ inches. Dimensions are not critical, except to the extent noted in U.S. Pat. No. 4,002,077 that the channel 24 must be dimensioned so as to provide laminar flow of the fluid in the channel.

With respect to the selection of materials, all materials in contact with mercury must be compatible with the mercury. While other floatation fluids can be used in place of mercury, a corresponding density material must be used for the inertial mass. Since the sensitivity of the output signal to changes in angular rate decreases relative to decreases in the moment of inertia of the seismic mass, denser materials for the seismic mass are better.

It should be recognized that the density of the mercury will exactly match the density of the seismic mass material only at one temperature. Slight density imbalances due to temperature dependant density changes, will produce a force loading on the bearings as the unit is accelerated or vibrated in any lateral plane. However, the buoyancy of the fluid reduces the loading at the bearings to only a few pounds, or fractions of a pound in the case of moderate temperature variations. Small, high-quality, low-friction bearings can be selected to carry the small load due to temperature dependant density imbalances.

The neutrally buoyant system has a considerably lower cost than a hydrostatic bearing version and a size and weight that is comparable or less than prior systems for sensing inertial rate.

Since the principles of operation of the instant invention is the same as that described in U.S. Pat. No. 4,002,077, the disclosure thereof relative to the theory of operation is incorporated hereby by reference.

Nevertheless, it is worthwhile to specifically summarize the theory of operation.

Assuming that inertial mass 12 is fixed inertially, as housing 10 is rotated relative thereto the fluid 18 in the channel 24 adjacent the housing surface flows at the same velocity as the housing surface. The fluid 18 next to inertial mass 12 is at zero velocity because the inertial mass 12 is stationary. Viscous shear forces cause fluid 18 to flow around the channel 24 in the direction of rotation of the housing 10 with an average velocity less than the peripheral velocity of the channel 24. As fluid flow is diverted by vane 45, on one side of the vane 45 a pressure build up is produced and on the other side of the vane a pressure reduction is produced.

The pressure differences established in sensing regions 23 and 35 are a function of the turning rate and turning acceleration. Within the operating range of primary interest, the pressure difference is predominantly a function of the turning rate only.

If the housing 10 turns at a constant angular velocity for a relatively long period of time, the seismic mass 12 achieves the same angular velocity as the housing 10, and no signal results. During very slow changes of angular velocity, the signal is nearly proportional to the rate of change of angular velocity, and the device acts as an angular accelerometer. Finally, as the changes in angular velocity become more rapid, the signal becomes proportional to the angular velocity of the housing itself. In this last regime, the device functions as an angular velocity sensor, or equivalently as an integrating angular accelerometer. Among the most useful applications of the invention will be for sensing angular velocities that are varying relatively rapidly. The frequency of angular velocity variation above which the device performs as an accurate angular velocity sensor is determined by specific values of design parameters.

What is claimed is:

1. An integrating angular accelerometer for measuring angular rate of a rotating body which comprises:
    a housing fixedly attached to the rotating body having an annularly shaped channel operatively disposed therein;
    means for remaining inertially fixed when said housing is rotated relative thereto which includes;
    a seismic mass formed of tungsten and molybdenum rotatably supported within said housing;
    an instrument ball bearing axially disposed intermediate said housing and a first end of said seismic mass;
    viscous liquid means for improving the sensitivity of the output signal from said accelerometer with respect to changes in angular rate which includes;
    mercury liquid disposed in said channel about the acceleration sensitive axis of said seismic mass, said channel dimensioned to provide laminar fluid flow within said mercury upon relative rotation of said housing and said seismic mass, said mercury and seismic mass having equally selected mass densities to make said seismic mass neutrally bouyant in said housing to eliminate detrimental effects of shock and vibration on said instrument bearing;
    reservoir means fluidically coupled to said channel providing a temperature compensating expansion chamber for said mercury liquid;
    splitter means operatively disposed in said housing and channel for generating a pressure difference on a first and second sensing region; and
    means for sensing said pressure difference wherein the output signal is proportional to the angular velocity of said housing which includes;

a differential pressure transducer operatively disposed proximate to said first and second sensing region; and means for isolating said transducer from said first and second sensing region.

2. A device as recited in claim 1 wherein said means for isolating said transducer includes:

a first cylinder member having a first diaphram on one end thereof adjacent to said first sensing region, first isolation liquid operatively disposed in abutment with said first diaphram, and a first fluid isolator member disposed intermediate said first isolation liquid and said differential transducer, and seal means for preventing escape of said first isolation liquid from said first cylinder.

3. A device as recited in claim 2 wherein said means for isolating said transducer further includes:

a second cylinder member having a second diaphram on one end thereof adjacent to said second sensing region, second isolation liquid operatively disposed in abutment with said second diaphram, and a second fluid isolator member disposed intermediate said second isolation liquid and said differential transducer, and seal means for preventing escape of said second isolation liquid from said second cylinder member.

* * * * *